(12) United States Patent
 Pidduck (10) Patent No.: US 8,983,920 B2
(45) Date of Patent: Mar. 17, 2015

(54) SYSTEM AND METHOD OF QUALITY ASSESSMENT OF A SEARCH INDEX

(75) Inventor: Patrick Thomas Sidney Pidduck, Waterloo (CA)

(73) Assignee: Open Text S.A., Luxembourg (LU)

( * ) Notice: Subject to any disclaimer, the term of this patent is extended or adjusted under 35 U.S.C. 154(b) by 295 days.

(21) Appl. No.: 13/591,709

(22) Filed: Aug. 22, 2012

(65) Prior Publication Data
US 2014/0181056 A1    Jun. 26, 2014

Related U.S. Application Data

(60) Provisional application No. 61/528,965, filed on Aug. 30, 2011.

(51) Int. Cl.
*G06F 17/30* (2006.01)

(52) U.S. Cl.
CPC ..................... *G06F 17/30* (2013.01)
USPC ........... 707/697; 707/696; 707/705; 707/706; 707/737

(58) Field of Classification Search
CPC .......... G06F 17/30023; G06F 17/3002; G06F 17/30424; G06F 17/3066; G06F 17/30693
USPC ........................ 707/696, 697, 705, 706, 737
See application file for complete search history.

(56) References Cited

U.S. PATENT DOCUMENTS

| | | | |
|---|---|---|---|
| 2009/0080902 A1* | 3/2009 | Noheji et al. ................. | 398/159 |
| 2009/0216740 A1* | 8/2009 | Ramakrishnan et al. ......... | 707/5 |
| 2011/0113048 A1* | 5/2011 | Njemanze ..................... | 707/755 |

OTHER PUBLICATIONS

Gamon et al.; "Search right and thou shalt find . . . Using Web Queries for Learner Error Detection"; Procedings of the NAACL HLT 2010; pp. 37-44; Jun. 2010.*

* cited by examiner

*Primary Examiner* — Monica Pyo
(74) *Attorney, Agent, or Firm* — Sprinkle IP Law Group (57) ABSTRACT

Systems, methods, and computer program products for enabling assessment of the quality of a search index. In one embodiment, objects are processed to produce corresponding text that is stored and indexed. The objects are also processed to identify and store corresponding metadata values for indexing. Error conditions that are detected during the processing of objects to generate corresponding text are tracked and compared to determine the most severe of the error conditions. An indication of the most severe error condition is stored in a first consolidated error field. Errors that are encountered in the identification and storage of metadata values are counted and this count is stored in a second consolidated error field. Both of the consolidated error fields are indexed in the same manner as the text and metadata for the objects, so that the stored error information can be used in queries of the search index.

18 Claims, 4 Drawing Sheets

| 301 | 300 | 300 | 300 | 300 | 300 | 300 | 300 | 307 | 308 | 309 | 302 |
|---|---|---|---|---|---|---|---|---|---|---|---|
| OBJECT ID | AUTHOR ID | OWNER ID | EDITOR ID | AUTHOR NAME | OWNER NAME | CREATOR NAME | EDITOR NAME | QUALITY MEASUREMENT | METADATA ERROR COUNT VALUE | TEXT ERROR COUNT VALUE | TEXT |
| | | | | | | | | | | | |
| | | | | | | | | | | | |
| | | | | | | | | | | | |
| | | | | | | | | | | | |
| | | | | | | | | | | | |

SYSTEM AND METHOD OF QUALITY ASSESSMENT OF A SEARCH INDEX

CROSS-REFERENCE TO RELATED APPLICATION(S)

This application is a conversion of and claims a benefit of priority from U.S. Provisional Application No. 61/528,965, filed Aug. 30, 2011, entitled "SYSTEM AND METHOD OF QUALITY ASSESSMENT OF A SEARCH INDEX," which is incorporated by reference as if set forth herein in its entirety.

TECHNICAL FIELD

This disclosure relates generally to the field of computerized search systems, and more particularly to systems, methods and products which utilize aggregate indices to facilitate searches, but still enable the identification of specific fields associated with retrieved data.

BACKGROUND OF THE RELATED ART

In computerized search systems, when objects are given to a search engine for indexing, they often need to be converted, analyzed and transformed as part of the indexing process. There may be many different tasks that need to be performed in order to prepare the objects to be indexed. For instance: files within an archive (such as a "ZIP" file) may need to be extracted and decompressed; document files may need to be filtered to extract their full text content; encrypted information may require decryption; encoded data may need to be converted to another encoding format; image files may need to have OCR (Optical Character Recognition) applied to convert the image into text; the text strings need to be broken into words (or tokens); audio files may need to have voice identification tags added; and so forth. There may be a large number of these steps, depending on the type of object that is being presented for indexing.

It is possible for one or more of these steps to fail. For example, the tasks may be only partially completed, or they may fail entirely. If one of the preparation tasks is only partially completed, it may nevertheless be sufficiently complete to allow the indexing of the object to proceed. In this case, the object may be searchable, but perhaps not perfectly so. For instance, some portion of an object's text, but not all of the text, may have been derived for the object, so that a search engine may be able to find some, but not all of the terms contained in the object.

While it may, in some cases, be desirable to be able to perform searches based on this incomplete information, this may not always be true. For example, in a litigation discovery process, a user may employ a search system to find all objects which are related to a specific patent application. If the objects were not perfectly indexed, the user may not know that the search results contain errors or are incomplete. As a result, the user may miss important documents.

Conventionally, errors and other problems in the process of preparing objects to be indexed are addressed a couple of ways. One approach is to simply stop the process when an error condition arises. Because this all-or-nothing approach produces the desired output (e.g., text conversions of object files) without user intervention only under perfect conditions, it is obviously inefficient. A second conventional approach is to provide dedicated error fields in which indications of error conditions can be stored. For instance, a truncated data field may be provided to indicate whether the text for an object had to be truncated during the process, a junk data field may be provided to indicate whether the data in the object appears to be random (as opposed to meaningful text), and so on. The use of dedicated fields to store indications of error conditions is problematic, however, for a number of reasons. For example, because there may be many different fields in which the error conditions are stored, a user may have to look in many different places to find the indicators of these conditions. Further, because each of the dedicated error condition fields has associated overhead (e.g., storage space), there may be a high resource cost associated with these fields.

In addition to the problem of text conversion errors, search systems may encounter errors in handling metadata associated with the objects. For instance, a search system may be configured to receive a numerical value representing a date, and to store this value in a numerical field. If, however, the system receives the date in a different format (e.g., with the month spelled out), it may not be able to process this information. Conventionally, this causes the system to simply stop, or at least stop processing the corresponding object.

It would therefore be desirable to provide means to process objects for implementation of a search engine that overcome these problems.

SUMMARY OF THE DISCLOSURE

This disclosure relates generally to the field of computerized search systems, and more particularly to systems, methods and products for searching objects, where one or more consolidated or summary error fields are maintained to facilitate assessment of the quality of a search index and/or the searches made using the index. Embodiments disclosed herein provide systems, methods, and computer program products for enabling assessment of the quality of a search index. In one embodiment, objects are processed to produce corresponding text that is stored and indexed. The objects are also processed to identify and store corresponding metadata values so that they can be indexed as well. Any error conditions that are detected during the processing of objects to generate corresponding text are tracked and compared to determine the most severe of the error conditions. An indication of the most severe one of the error conditions is stored in a first consolidated error field. Errors that are encountered in the identification and storage of metadata values are counted and this count is stored in a second consolidated error field. Both of the consolidated error fields are indexed in the same manner as the text and metadata for the objects, so that the stored error information can be used in queries of the search index.

One particular embodiment comprises a method for quality assessment of a search index. In this method, multiple storage locations are provided in a storage unit. For each of a plurality of objects, information is stored in one or more of the storage locations, each of which is associated with one of a plurality of fields and one of the plurality of objects. An indication of the consolidated error conditions associated with each object is also stored in a consolidated error field for the object. The indication of the consolidated error conditions may be, for example, an indicator of the most severe text conversion error, or the count of metadata errors. Separate consolidated error fields may be provided, for instance, for indicators of text errors and metadata errors. A search index is provided, where the search index includes a dictionary of terms that are contained in the information stored for the objects. The search index includes terms that are associated with the consolidated error field. A search of the index is enabled for terms in the index that are associated with the consolidated error field as well as the other fields (e.g., text and metadata). Retrieval of information from the storage locations in response to the search is then enabled.

Another embodiment is a computer program product that comprises a non-transitory computer readable medium having a set of computer instructions stored on it. The instructions are executable by a computer processor to perform a method essentially as described above.

Yet another embodiment is a computerized search system. The system includes a computer processor that is coupled to a storage unit. The system is configured to store information for each of a set of objects in storage locations within the storage unit. Each of the storage locations is associated with one of a set of fields and with one of the objects. The system also stores a consolidated indication of one or more error conditions for each of the objects. These indicators are stored in locations associated with a consolidated error field. The search system provides a search index which includes a dictionary of terms that are contained in the information (e.g., consolidated error indications, text or metadata) in the storage locations. The search system enables searches of the index for terms associated with the first consolidated error field, as well as the other fields. The search system also enables retrieval of information from the storage locations in response to queries of the search index.

Other alternative embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Document management systems often employ a search engine to allow for fast retrieval of information. A search engine can search the metadata and text of documents in a search index to determine which documents match search criteria, without having to parse the document itself.

Embodiments of a search engine described herein disclose process in which objects are converted, analyzed and transformed when they are indexed. While converting, analyzing and transforming the objects as part of an indexing process, one or more processes or sub-processes may partially or completely fail to perfectly index the object. Even if the indexing processes fail to perfectly index the objects, however, the objects may still be searchable using text or metadata that may nevertheless by available for the objects.

For a user interacting with the search engine, not knowing the quality or accuracy of the indexing of the object may delay or reduce productivity. Accordingly, users of the search engine desire to have measurements that assist or help understand the accuracy or limitations of the indexed objects within the search engine. For example, a user may use a search engine to find all related objects. However, the user may also desire to know how well the search system is performing. Therefore, having information describing whether the right objects within the search index and an associated quality or accuracy of the indexed objects may assist or help users using the search engine.

Figure 1:
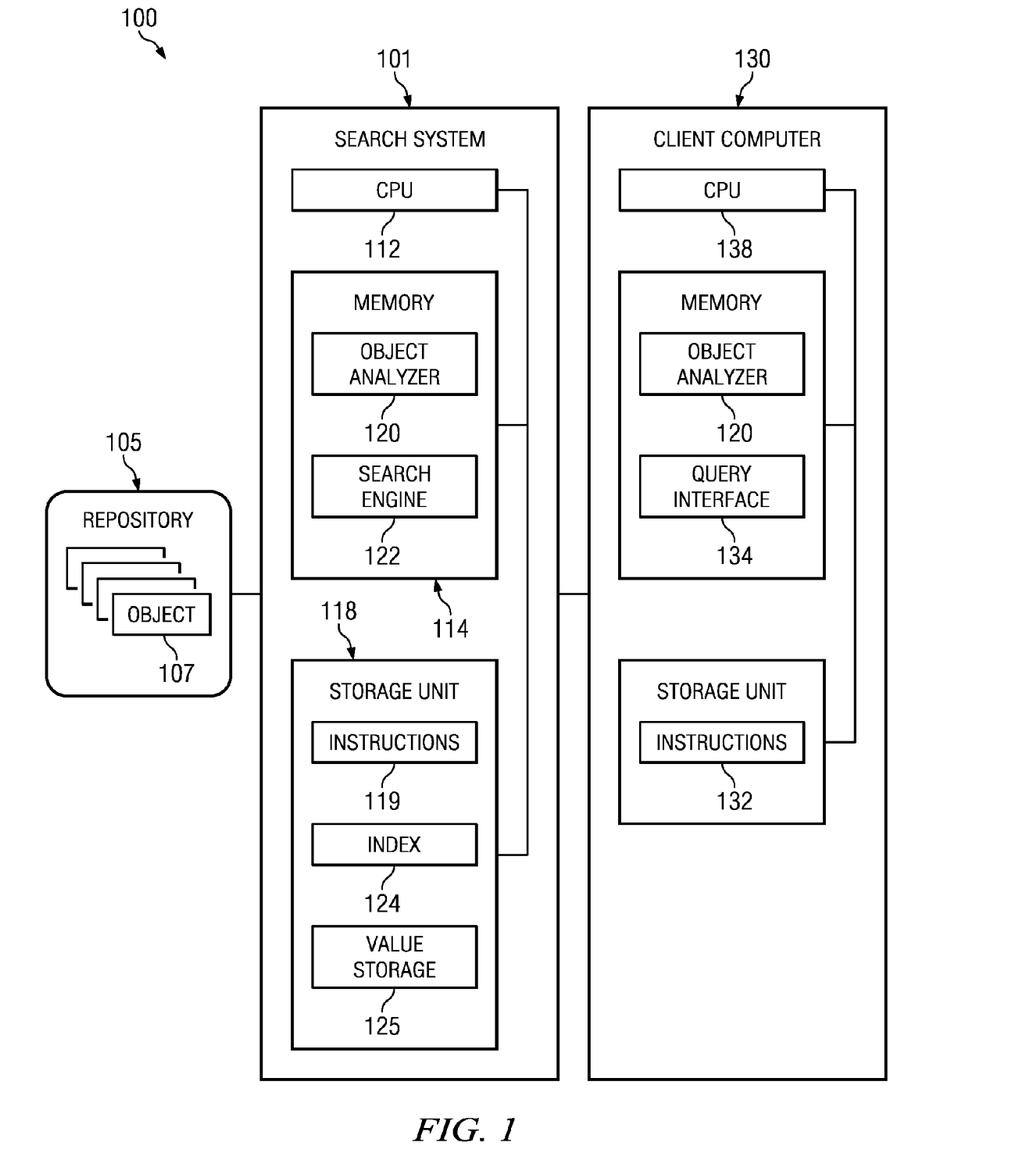
FIG. 1 depicts a functional block diagram illustrating a computing environment in which one embodiment can be implemented.

FIG. 1 depicts a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard—disk drives, flash memory devices, optical media and the like. Search system 101 may be connected to a data communications network (not shown).

Storage unit 118 stores computer executable instructions 119, an index 124, and value storage locations 125. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices.

Client computer system 130 may include components similar to those of the server of search system 101, such as a CPU, memory and storage. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figure 2:
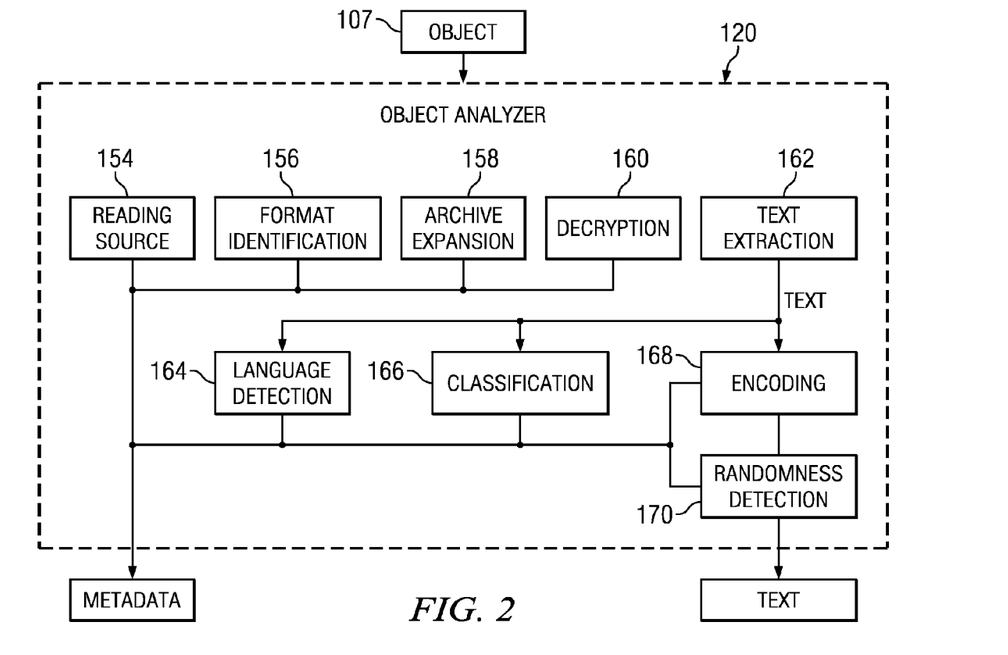
FIG. 2 depicts a functional block diagram illustrating one embodiment of an object analyzer.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that derive metadata for the object 107. For example, a document management system may provide a limited amount of metadata with the object 107. Object analyzer 120 can derive other metadata from the metadata provided, text or other properties of the object 107. As a specific example, a filter or piece of code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2 is provided by way of example. Object analyzer 120 may include any number of other modules to analyze an object and extract text and metadata to be indexed. Object analyzer 120 may be a portion of a larger program, such as a document management program, may be a separate program or may be implemented according any suitable programming architecture. In one embodiment, the process of determining metadata and text to be indexed maybe carried out by any number of different programs on a computer system or distributed across computer systems.

When the object 107 is being analyzed by the object analyzer 120 as discussed above, it is possible that one or more of the data module 154, format identification module 156, archive expansion module 158, decryption module, text extraction module 162, language detection module 164, encoding module 168, the randomness detection module 170 and/or any additional module within the object analyzer 120 partially or completely fail to index the object 107. In other words, one or more of the process or sub-processes involved in the indexing of the object may not complete without errors, warnings or other problems (which may be collectively referred to as error conditions). In the event that the object analyzer 120 partially or completely fails to complete its contribution to indexing the object 107, the indexing of the object 107 may continue such that the object 107 is still searchable using the available metadata or text of the object 107. Further, the metadata provided by the controlling application or derived by the object analyzer 120 for the object 107 may be incorrect. For example, a text string may have been provided in a metadata field that was expecting a date, a date may have been placed in a metadata field where an integer value was expected, information may be missing in a mandatory metadata field, or other formatting errors may be present. Nonetheless, the search system 101 may continue with the indexing process even if the object 107 contains incorrect or missing metadata values.

Table 1 as shown below, discloses exemplary processing steps, brief explanations of the processing steps and examples of status conditions in which the processing at the corresponding step did not complete perfectly, but where the indexing of the object may still continue.

TABLE 1

| Processing Step | Step Explanation | Sample Incomplete Status |
| --- | --- | --- |
| Reading Source Data | The data to be indexed may be encoded in a request, or may simply consist of a reference to data that must be downloaded or opened. | The object to be indexed is empty or has zero size. There is no data. |
| Format Identification | Examine the included file or data to determine what type it is. | Unsupported file format. |

TABLE 1-continued

| Processing Step | Step Explanation | Sample Incomplete Status |
|---|---|---|
| Archive Expansion | If the object is a "zip" file, then it must be decompressed. | Warning . . . multiple objects inside of an archive are treated as one single object. |
| Decryption | Some file formats allow part or all of the data to be protected by decryption. | Portions of this file could not be decrypted - the contents are unknown. |
| Text Extraction | A document such as a Microsoft Excel Spreadsheet cannot be directly indexed. A filter must examine the Excel file to extract the text. | The amount of text exceeds the configured size limit, and has been truncated to the maximum size. |
| Language Detection | Examines the text to make a determination of the language in which the text is written (English, French, Chinese, etc.). | Unable to determine the content language. |
| Classification | Applies rules based upon text and metadata to classify the content. | Unable to classify the object. |
| Encoding | There are many ways data may be represented, and conversion to a supported data encoding may be necessary. Unicode-32 bit may need to be re-encoded in Unicode UTF-8 form, for example. | Unknown encoding, assuming UTF-8. |
| Randomness | The system may analyze the data to be indexed to reject random information. | Object failed randomness test, text content has been discarded. |

In each case where a processing step contains an error condition, an error or warning level is assigned to the processing error condition. The error or warning levels may be selected to represent an impact of the indexing quality resulting from an error condition. In table 2, as shown below, lower error codes represent a higher quality of indexed text, and higher error codes represent a lower quality of indexed text. Other representations of error condition severity may be used in other embodiments.

TABLE 2

| Code | Meaning |
|---|---|
| 100 | Text indexed correctly, no material errors or warnings. |
| 105 | No text indexed, but the source material contained no text, so this is expected. This might occur when indexing a photograph, for example. |
| 110 | Text indexed fine, but the identification of the language of the text is uncertain. |
| 120 | Text indexed, but the source file also contained images, and if there was text in the image portion, it was not indexed. |
| 200 | The provided text indexed correctly, but there were linked or embedded objects that could not be included. |
| 210 | There were multiple objects contained in a single indexing request, typically multiple files in an archive file (zip file) or attachments to an email message. The text content from all files was indexed as a single file; no derived metadata from the attachments was created. |
| 220 | The majority of the text was indexed, but a small portion was unreadable, perhaps encrypted, and has not been indexed. |
| 300 | The input text was too large. The data was truncated, and only the first portion of the data was indexed. |
| 350 | The file type is not supported. No filter exists to extract the text from the file, and only the metadata has been indexed. |
| 400 | Random data. The provided text appears to be random binary data. Only metadata has been indexed, the text portion is discarded. |

When the object analyzer 120 processes the object 107, the object analyzer 120 may use a graduated system for determining a quality measurement score. The quality measurement score of the object 107 may be associated with the error code representing the quality of the indexing the object 107.

As each processing step is completed by the object analyzer 120, the quality of the step may be determined. As shown above in table 1, the quality of the indexing may be determined during the steps performed by each of the reading source data module 154, the format identification module 156, the archive expansion module 158, the decryption module 160, the text extraction module 162, the language detection module 164, the classification module 166, the encoding module 168 and the randomness detection module 170.

According to one embodiment, as each processing step occurs, the result of the quality measurement associated with the current step is compared to the current quality measurement of the object 107. If the quality measurement associated with the current step indicates a worse indexing quality than a quality measurement associated with the current quality code of the object 107, then the error code associated with the worse condition is entered into as the new quality measurement of the metadata of object 107.

The quality measurement scores are based on categorizing the relative severity of the error code associated with each error condition. As shown above in table 2, the error codes may be defined by a numerical value where lower numbers represent the better quality of indexing and higher numbers represent the worse quality of indexing. Further, the highest error code indicates the most severe error condition and may be chosen as the quality measurement score to represent the overall quality of the indexing for the object 107. Accordingly, when all of the processing steps for indexing an object 107 are complete, the quality measurement score may be indexed as a metadata field associated with the object 107. Because the quality measurement score is representative of various different error conditions that would conventionally be indicated by the values of corresponding different, individual metadata fields, the metadata field that stores the quality measurement score may be referred to as a summary error field or consolidated error field.

In further exemplary embodiments, a user may configure the error quality codes associated with indexing errors. User configuration would allow for the user to specify ordering of the quality codes to closely or accurately match the requirements of the user. For example, a user might desire or require that a condition "unable to read encrypted data" is defined as more or less important than the condition "multiple objects in a zip file are indexed as a single object"

The quality measurements as described above are an assessment of the text portion of the hybrid text and metadata searching system. However, the same principles may be applied to metadata regions, if desired by a user. For example, if the description of an object is an important or critical search term, and the metadata for the description is missing or incorrectly formatted, a quality code representing "full text indexed correctly, but essential metadata is missing" could be incorporated in the list of error codes at an appropriate severity level.

In the context of this disclosure, the phrase "search term" represents a technical concept or interpretation. For example, a search term in the context of this disclosure can be a word, a string, or any combination of the following:
phrases
numbers
strings
logical operations (e.g., AND, OR, NOT, etc.)
ordering or operations (e.g., using parenthesis)
relationships (e.g., greater than, less than, not equal to, etc.)
similarities based on thesaurus, stemming, sounds-like, etc.
wildcards and pattern matching To this end, a search term can also refer to any term that is used in a query and that has been modified or generated by any commonly used techniques.

For context, a search term could be a word "John" or a more complex expression like: (>"bob" or !=("123" or a*)) and (sounds-like "smith" or thesaurus "doctor" or "medical doctor" or stem "medical").

Accordingly, the overall quality measurement for indexed objects is captured or saved in a small or minimal number of metadata regions. Thus, the impact on the size of index (i.e., the amount of space required for error condition metadata regions) resulting from enabling searching of the quality measurement for the objects is minimized or reduced. Therefore, a larger system may be deployed or implemented within a desired or required amount of system resources, such as disk space or memory.

Further, since the quality measurements for each of the indexed objects are captured in a minimal set of metadata fields, it may be easier to display the quality measurements so that users can interpret, extract or use the quality measurements, as compared to conventional systems that have separate error fields for each of the possible error conditions. It may also be easier for users to create search requests incorporating the quality measurements when the error conditions are contained in a smaller number of metadata fields. Further, automated systems may more easily implement search queries to identify various problems with the search index, create reports, and undertake associated actions. For example, if a system locates the majority or all of the documents that have temporary file read errors, the system may initiate re-indexing operations on these documents.

While quality measurements are expressed numerically in the above embodiment, the quality measurements may be expressed according to any suitable predefined scheme (e.g., alphabetic codes, alpha-numeric codes, or any other indicator of quality). Additionally, while each process is shown as outputting a single quality measurement, a process may output any number of quality measurements as needed, or as desired. One or more of the quality measurements may be stored in the metadata for an object in index 124.

An additional exemplary embodiment may include an error count system for metadata. Each metadata value provided for indexing may be analyzed against a number of rules. For example, the rules may include checks such as whether the name of the metadata field is formatted correctly, whether a value contains an integer when the metadata field is expecting an integer, whether a value contains a valid date string when the field is expecting a date, whether a received data string is too long, whether a value is provided when the field is required, whether there is an instance of an error when analyzing the metadata, and so on. If any of these rules are not satisfied, a count value associated with the metadata may be incremented. The incremented metadata count value may represent the number of text errors in the metadata. Also, the count value may be stored in a searchable field of the metadata in index 124.

Because the count value is representative of various different error conditions that are associated with different metadata fields and would conventionally be indicated by the values of corresponding different, individual metadata fields, the metadata field that stores the count may be referred to as a summary error field or consolidated error field.

Because the quality measurements and/or the count values are stored as standard searchable metadata fields, the quality measurements and/or the count values may be used to conduct analytic search queries. Accordingly, a user may create search requests that incorporate the quality measurements and/or the count values. In one embodiment, a user may construct a search query with parameters such as "only find objects with no indexing errors", or "restrict search to objects with between 2 and 5 indexing errors." For example, the system may use a search query string such as—"green tea" AND IndexErrors:0—in order to find objects that contain the extract string "green tea" and that have no indexing errors based on the count variable. In this example, the metadata count value is stored in a metadata field called "IndexErrors."

In some embodiments, the count variables and the quality measurement may be used together in search queries. For example, a user may apply a query such as "French fries AND Quality:<200 AND IndexErrors:1 . . . 2" to find all indexed objects containing the word French and the word fries that have a good quality assessment (the quality measurement is less than 200) and have exactly 1 or 2 metadata index errors (where the metadata count value is indexed in a metadata field called IndexErrors).

Further, a separate text count value may be stored in a searchable field of the metadata that records the number of text indexing errors that occur while analyzing the text of the object 107. In further exemplary embodiments, the number of text errors may be incorporated with the metadata count value, or a separate text error count value.

Moreover, when a user conducts a search, the search engine can return a measure of quality based on the indexing error counts and/or quality measurements. This can include returning indexing error counts and/or quality measurement values to the user or other indication of quality derived from the index counts and/or quality measurement values. Consequently, the user will have a better idea of the quality of search results.

In the above-mentioned examples, a user has constructed the search queries. It should be noted, however, that the user could be any system that issues queries to the search system, and may include other computer programs that searching on behalf of users, creating reports or running automatic processes. Also, it should be noted that the implementation of the above-mentioned embodiments to reduce and consolidate quality measurements is not mutually exclusive with other error code reporting systems. For example, if it is desired that the error condition of "data encrypted and therefore unreadable" be available as a separate value which may be queried, then this may be implemented without impacting the example embodiments. In a further example, a user may choose whether an error code should be excluded from the quality or count processing of the embodiments. For instance, if a particular error code is stored in a separate metadata field so that it can be independently searchable, it may be excluded from the indexing error counts and/or quality measurements.

Figure 3:
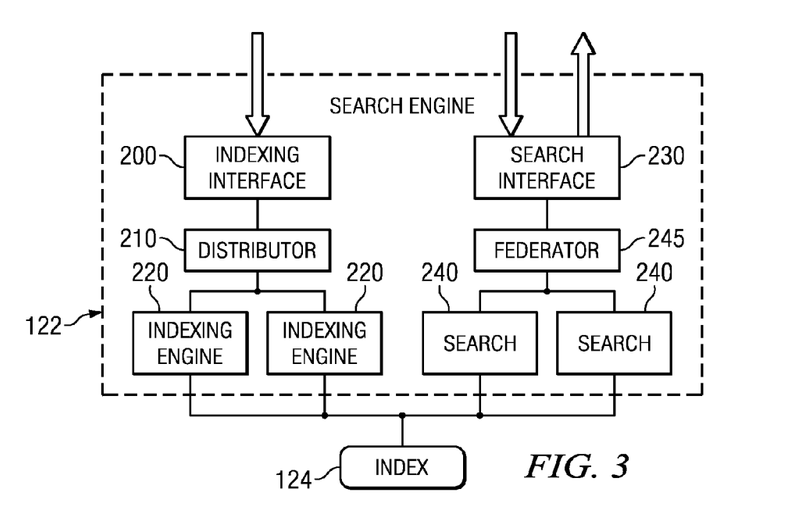
FIG. 3 depicts a functional block diagram illustrating one embodiment of a search engine.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that act on the indexing request to update index 124. Search engine 122 may also include a search interface 230 to receive queries (e.g., from a content server or other source). Search interface 230 may send queries to search modules 240. Federator 245 gathers the results from all search modules together, and generates a response to the query received through search interface 230. Search modules 240 are responsible for performing searches on an index partition, computing relevance score, sorting results, and retrieving metadata regions to return in a query.

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indices. For example, a separate index can be used by each indexing engine.

Figure 4:
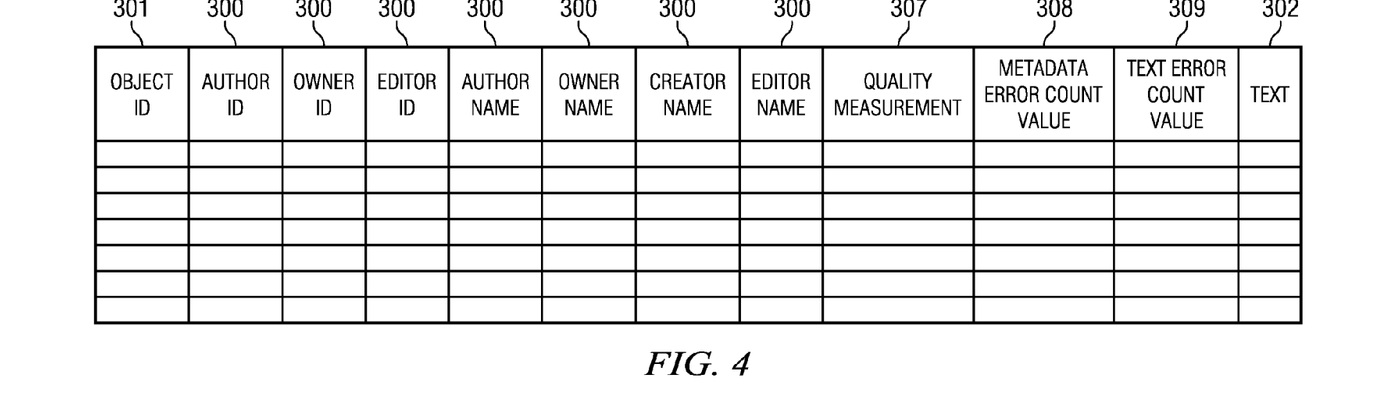
FIG. 4 depicts a diagrammatic representation of one embodiment of regions or fields for a portion of an index.

FIG. 4 depicts a diagrammatic representation of one embodiment of regions or fields for a portion of index 124. Index 124 includes a list of some or all objects in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, example, include a list of terms in the text of an object.

Further, the index 124 may include fields indicating the quality of the index, such as a quality measurement 307 (e.g., an indicator of the most severe error or warning), a metadata error count value 308, or a text error count value 309 for each object ID, as discussed above. Index 124 may also include a text region 301 for an object. For example, the index may include some or all of the content of an object.

While shown as a single index, index 124 may be partitioned. In index partitioning, in one embodiment, the index of objects in repository 105 may be split into multiple indexes such that some objects are listed in one index partition, while other objects are listed in the other index partitions. Index partitioning may also reduce resource usage and search time. Furthermore, separate indexes may be maintained for metadata and text and/or different metadata regions or fields. Index 124 can be stored according to any suitable storage scheme.

Figure 5:
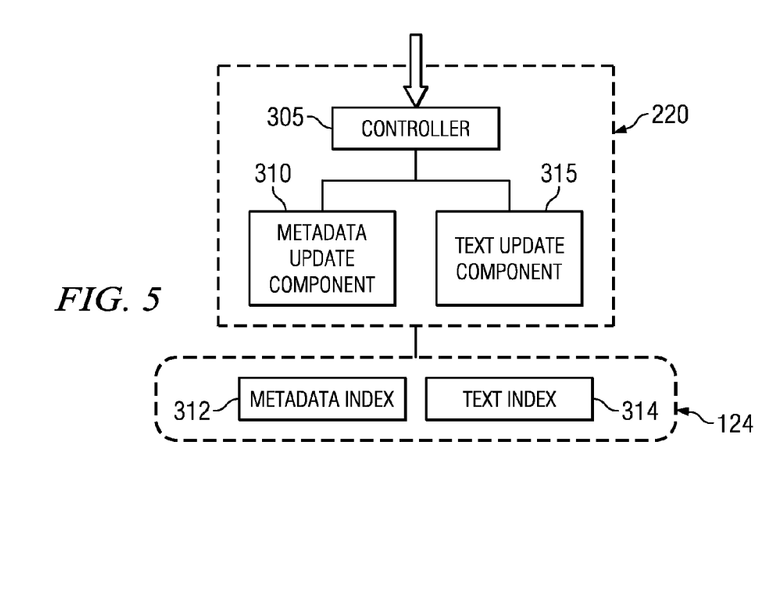
FIG. 5 depicts a functional block diagram illustrating one embodiment of an indexing engine.

FIG. 5 depicts a diagrammatic representation of one embodiment of an indexing engine 220 to maintain index 124. In this embodiment, indexing engine 220 can include an indexing controller 305, a metadata update component 310 and a text update component 315. In this embodiment, index 124 is maintained as a separate metadata index 312, which contains metadata for objects in repository 105, and text index 314, which contains content text from objects in repository 105.

Indexing controller 305 receives indexing requests (e.g., from a distributor, another application or other source). In the embodiment of FIG. 5, the indexing request may include an instruction to add an object, delete an object, delete an object, modify an object or replace an object in index 124. The indexing request will typically also include the information to be added or changed, such as the full text content to be indexed and the associated metadata for the object. The indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request is specifically provided by the application providing the indexing request. This might be data such as an identifier for the object, the date or time it was first added to the system, or the identity of the user who manages the object.

Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written.

An indexing engine can receive an indexing request from an application, distributor or other source. An indexing request specifies an operation to be taken on index 124 for an object and any metadata or text for that action. For context, an application that generates an Indexing request might be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate, The text update component will typically support instructions such as add an object, replace an object, or delete an object.

Metadata update component 310 is responsible for processing requests to index metadata associated with an object in the Search Index. This may include building and maintaining dictionaries of search terms, maintaining internal search data structures, and updating the representation of the metadata portion of the search index in memory or on disk as appropriate. Metadata update component 310 will typically support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according any suitable programming architecture. In one embodiment, the processes of indexing engine 220 may be distributed across multiple computer systems.

Figure 6:
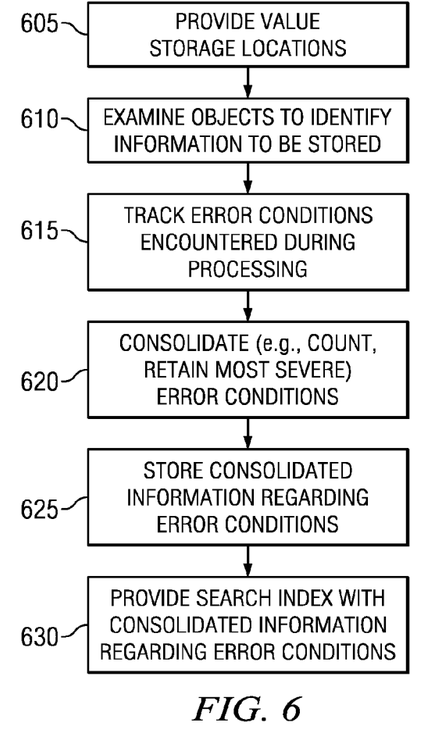
FIG. 6 depicts a flow diagram illustrating a method for providing a measure of the quality of a search index in one embodiment.

FIG. 6 depicts a flow diagram illustrating one embodiment of a method for providing a measure of the quality of a search index. This embodiment is implemented in a computerized search system that provides value storage locations in which information associated with a plurality of objects can be stored (605). The value storage locations may be in a storage unit that is contained in or coupled to the search system. The search system examines each of the plurality of objects to identify information that will be stored for the objects (610). This information may include textual information or metadata for the objects. As each object is examined to identify the information to be stored for that object, the error conditions that arise are tracked by the search system (615). These error conditions may be associated with the text conversion of the object, or they may be associated with the identification and storage of metadata for the object.

As the error conditions are tracked, they are consolidated by the system (620). For example, error conditions associated with the text conversion of the object may be compared to identify the most severe of these conditions. Error conditions associated with the identification and storage of metadata values may be consolidated by simply maintaining a count of the error conditions that occur. The consolidated error information for the object is then stored in one or more of the storage locations which is associated with a consolidated error field (625). The stored error condition information may include the most severe text conversion error, the metadata error count, or a combination of both. The contents of the consolidated error field are then indexed in the same manner as the other fields associated with the objects to produce a searchable index (630).

Figure 7:
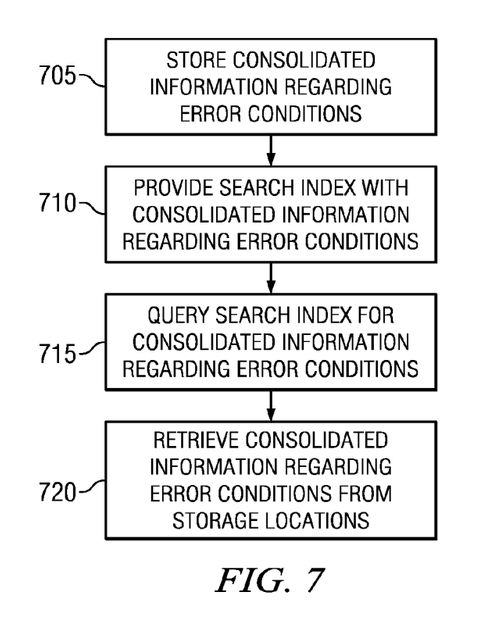
FIG. 7 depicts a flow diagram illustrating a method for using a search index that includes consolidated error information in one embodiment.

Another embodiment may comprise a method for using a search index that includes consolidated error information to assess the quality of a search index or searches performed using the index, as illustrated in FIG. 7. In this method, consolidated information regarding error conditions encountered during the indexing of a set of objects is stored, along with the text information and metadata information for the objects (705). A search index containing terms found in the consolidated error condition information is provided (710). The search index may be generated as described above, with error condition terms being indexed in the same manner as the terms found in text or metadata fields associated with the objects. The search index is searched for terms that may appear in the consolidated error condition information (715). If the search query is satisfied for any of the objects, the consolidated error condition information, or any of the other information stored for the identified objects, can be retrieved from the corresponding storage locations (720).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium"is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for quality assessment of a search index, the method comprising:
   providing a plurality of storage locations in a storage unit; and
   for each of a plurality of objects:
      storing information in one or more of the storage locations, wherein each of the storage locations is associated with one of a plurality of fields and one of the plurality of objects;
      storing a first indication of one or more error conditions in one of the storage locations for the object which is associated with a first consolidated error field;
      providing a search index, wherein the search index includes a dictionary of terms that are contained in the information stored in the one or more of the storage locations, including ones of the storage locations associated with the first consolidated error field;
      enabling a search of the search index for terms associated with the first consolidated error field;

enabling retrieval of information from one or more of the storage locations in response to the search of the search index; and consolidating information for a plurality of different error conditions and thereby producing the first indication of the one or more error conditions by, for each of the plurality of objects, maintaining a count of a plurality of error conditions associated with storing metadata for the object.

2. The method of claim 1, further comprising, for each of the plurality of objects:

examining the object and processing the object to produce text associated with the object, wherein the information stored in the storage locations includes the text associated with the object, wherein the one or more error conditions occur during the processing of the object to produce the text associated with the object.

3. The method of claim 1, further comprising, for each of the plurality of objects:

examining the object and identifying metadata associated with the object, wherein the information stored in the storage locations includes the metadata associated with the object, wherein the one or more error conditions occur during the identification or storage of the metadata associated with the object.

4. The method of claim 1, wherein consolidating information for a plurality of error conditions comprises, for each of the plurality of objects:

comparing multiple error conditions associated with text conversion of the object and producing an indication of a highest error condition of the multiple error conditions.

5. The method of claim 4, wherein the method further comprises storing a second indication of one or more error conditions in one of the storage locations for the object which is associated with a second consolidated error field, wherein the second indication of one or more error conditions comprises the count of the plurality of error conditions associated with storing metadata for the object.

6. A computer program product comprising a non-transitory computer readable medium having a set of instructions stored thereon, the instructions executable by a processor to:

for each of a plurality of objects:

store information in one or more of the storage locations, wherein each of the storage locations is associated with one of a plurality of fields and one of the plurality of objects;

store a first indication of one or more error conditions in one of the storage locations for the object which is associated with a first consolidated error field;

provide a search index, wherein the search index includes a dictionary of terms that are contained in the information stored in the one or more of the storage locations, including ones of the storage locations associated with the first consolidated error field;

enable a search of the search index for terms associated with the first consolidated error field;

enable retrieval of information from one or more of the storage locations in response to the search of the search index; and consolidate information for a plurality of different error conditions and thereby produce the first indication of the one or more error conditions by, for each of the plurality of objects, maintaining a count of a plurality of error conditions associated with storing metadata for the object.

7. The computer program product of claim 6, wherein the instructions are further executable by the processor to, for each of the plurality of objects, examine the object and process the object to produce text associated with the object, wherein the information stored in the storage locations includes the text associated with the object, wherein the one or more error conditions occur during the processing of the object to produce the text associated with the object.

8. The computer program product of claim 6, wherein the instructions are further executable by the processor to, for each of the plurality of objects, examine the object and identify metadata associated with the object, wherein the information stored in the storage locations includes the metadata associated with the object, wherein the one or more error conditions occur during the identification or storage of the metadata associated with the object.

9. The computer program product of claim 6, wherein the instructions are executable by the processor to consolidate information for the plurality of error conditions by, for each of the plurality of objects, comparing multiple error conditions associated with text conversion of the object and producing an indication of a highest error condition of the multiple error conditions.

10. The computer program product of claim 9, wherein the instructions are further executable by the processor to store a second indication of one or more error conditions in one of the storage locations for the object which is associated with a second consolidated error field, wherein the second indication of one or more error conditions comprises a count of a plurality of error conditions associated with storing metadata for the object.

11. The computer program product of claim 6, wherein the instructions are further executable by the processor to consolidate information for the plurality of error conditions by, for each of the plurality of objects, maintaining a count of a plurality of error conditions associated with storing metadata for the object.

12. A computerized search system for quality assessment of a search index, the system comprising;

a processor; and a storage unit coupled to the processor and storing instructions that are executable by the processor;

wherein the processor is configured to execute the instructions to, for each of a plurality of objects:

store information in one or more of the storage locations, wherein each of the storage locations is associated with one of a plurality of fields and one of the plurality of objects;

store a first indication of one or more error conditions in one of the storage locations for the object which is associated with a first consolidated error field;

provide a search index, wherein the search index includes a dictionary of terms that are contained in the information stored in the one or more of the storage locations, including ones of the storage locations associated with the first consolidated error field;

enable a search of the search index for terms associated with the first consolidated error field; and enable retrieval of information from one or more of the storage locations in response to the search of the search index, wherein the instructions are further executable by the processor to consolidate information for a plurality of different error conditions and thereby produce the first indication of the one or more error conditions by, for each of the plurality of objects, maintaining a count of a plurality of error conditions associated with storing metadata for the object.

13. The search system of claim 12, wherein the instructions are further executable by the processor to, for each of the plurality of objects, examine the object and process the object to produce text associated with the object, wherein the information stored in the storage locations includes the text associated with the object, wherein the one or more error conditions occur during the processing of the object to produce the text associated with the object.

14. The search system of claim 12, wherein the instructions are further executable by the processor to, for each of the plurality of objects, examine the object and identify metadata associated with the object, wherein the information stored in the storage locations includes the metadata associated with the object, wherein the one or more error conditions occur during the identification or storage of the metadata associated with the object.

15. The search system of claim 12, wherein the instructions are executable by the processor to consolidate information for the plurality of error conditions by, for each of the plurality of objects, comparing multiple error conditions associated with text conversion of the object and producing an indication of a highest error condition of the multiple error conditions.

16. A computerized search system for quality assessment of a search index, the system comprising;
  a processor; and
  a storage unit coupled to the processor and storing instructions that are executable by the processor;
  wherein the processor is configured to execute the instructions to, for each of a plurality of objects:
    store information in one or more of the storage locations, wherein each of the storage locations is associated with one of a plurality of fields and one of the plurality of objects;
    store a first indication of one or more error conditions in one of the storage locations for the object which is associated with a first consolidated error field;
    provide a search index, wherein the search index includes a dictionary of terms that are contained in the information stored in the one or more of the storage locations, including ones of the storage locations associated with the first consolidated error field;
    enable a search of the search index for terms associated with the first consolidated error field; and
    enable retrieval of information from one or more of the storage locations in response to the search of the search index,
  wherein the instructions are further executable by the processor to consolidate information for a plurality of different error conditions and thereby produce the first indication of the one or more error conditions, wherein consolidating information for a plurality of error conditions comprises, for each of the plurality of objects:
    comparing multiple error conditions associated with text conversion of the object and producing an indication of the most severe one of the multiple error conditions, and
  wherein the instructions are further executable by the processor to store a second indication of one or more error conditions in one of the storage locations for the object which is associated with a second consolidated error field, wherein the second indication of one or more error conditions comprises a count of a plurality of error conditions associated with storing metadata for the object.

17. The search system of claim 16, wherein the instructions are further executable by the processor to, for each of the plurality of objects, examine the object and process the object to produce text associated with the object, wherein the information stored in the storage locations includes the text associated with the object, wherein the one or more error conditions occur during the processing of the object to produce the text associated with the object.

18. The search system of claim 16, wherein the instructions are further executable by the processor to, for each of the plurality of objects, examine the object and identify metadata associated with the object, wherein the information stored in the storage locations includes the metadata associated with the object, wherein the one or more error conditions occur during the identification or storage of the metadata associated with the object.

* * * * *